United States Patent
Bohannon et al.

(10) Patent No.: US 6,571,908 B2
(45) Date of Patent: Jun. 3, 2003

(54) SHIELDING ENCLOSURE

(75) Inventors: John Robert Bohannon, Richmond, VA (US); Brian Williamson, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/931,903

(22) Filed: Aug. 20, 2001

(65) Prior Publication Data

US 2003/0034200 A1 Feb. 20, 2003

(51) Int. Cl.[7] ............................................... A47B 81/06
(52) U.S. Cl. ..................... 181/198; 181/202; 160/201
(58) Field of Search .................... 181/198, 200, 181/202, 203, 204, 205, 208; 160/30, 32, 34, 37, 113, 115, 152, 197, 201, 203, 204; 366/197, 347; 312/138.1; 206/320

(56) References Cited

U.S. PATENT DOCUMENTS

| | | |
|---|---|---|
| 2,701,618 A | 2/1955 | Montgomery |
| 3,643,880 A | 2/1972 | Peterson, Jr. |
| 3,868,040 A | 2/1975 | Langmack, Jr. et al. |
| 4,129,264 A | 12/1978 | Lanin et al. |
| 4,297,038 A | 10/1981 | Falkenbach |
| 4,375,876 A * | 3/1983 | Stewart .................. 160/201 |
| D295,012 S | 4/1988 | Gelber |
| 4,883,144 A | 11/1989 | Haushalter et al. |
| 5,272,285 A | 12/1993 | Miller |
| 5,432,306 A | 7/1995 | Pfordresher |
| 5,533,797 A | 7/1996 | Gelber |
| 5,696,358 A | 12/1997 | Pfordresher |
| 5,957,577 A | 9/1999 | Dickson et al. |
| 6,019,238 A | 2/2000 | Kindig et al. |
| D424,865 S | 5/2000 | Crescenzi et al. |
| D427,016 S | 6/2000 | Kindig et al. |

* cited by examiner

Primary Examiner—Khanh Dang
(74) Attorney, Agent, or Firm—John H. Thomas, P.C.

(57) ABSTRACT

A shielding enclosure, for example an appliance sound enclosure comprises a base, a front shield and a top shield. The base is fixed onto a surface and has a back wall and pair of sidewalls connected to the back wall. The front shield is adapted to be rotatably mounted onto the base and is slidingly connected to the top shield by a pin-in-slot connection. The top shield is adapted to be rotatably mounted onto the base and is slidingly connected to the front shield by a pin-in-slot connection. The front and top shields have arcuate panels that, in combination with the rotation around the base, provide for an enclosure around an appliance.

20 Claims, 5 Drawing Sheets

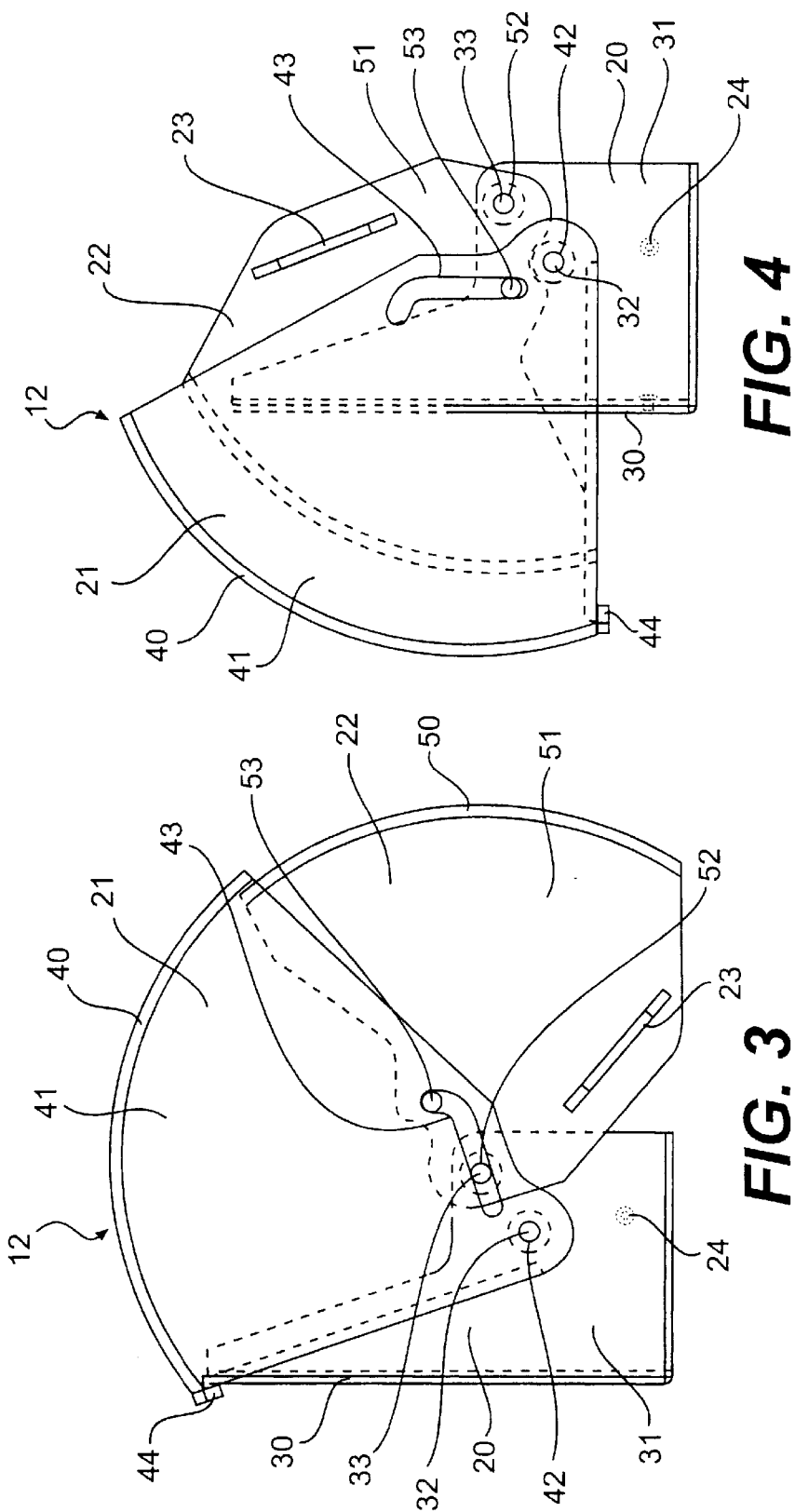

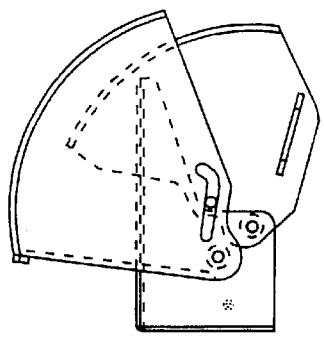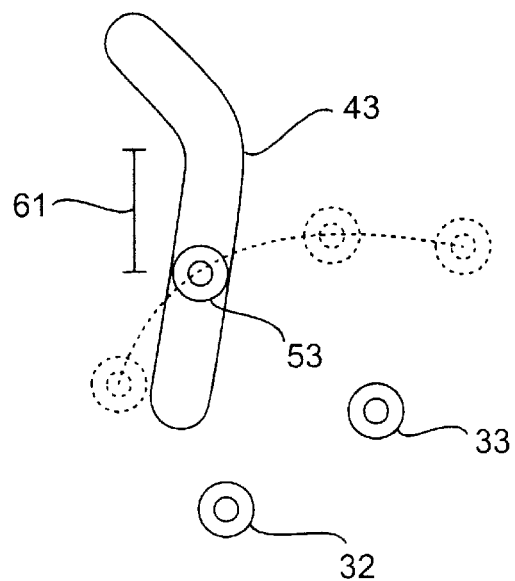
FIG. 6C
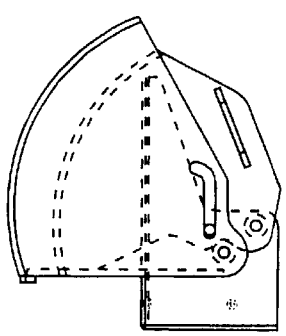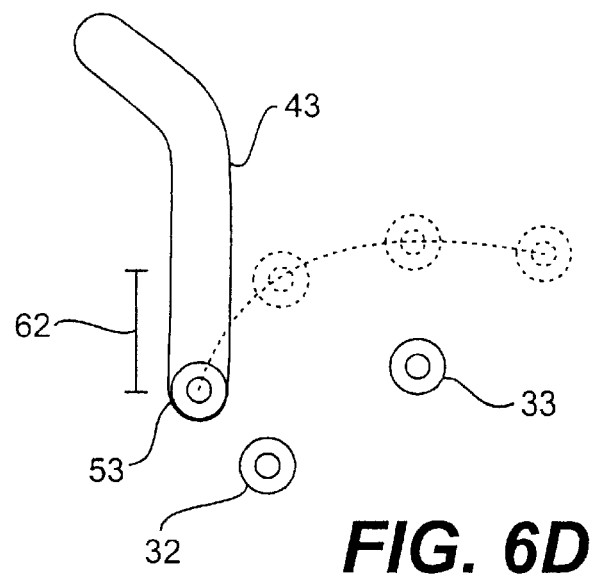
FIG. 6D

SHIELDING ENCLOSURE

This invention describes a shielding enclosure for any purpose and by way of a particular example a shielding enclosure for appliances such as food processors, blender and the like.

BACKGROUND OF THE INVENTION

Frequently, it is necessary to provide a low profile enclosure for isolating an activity occurring within an enclosure. One example is to shield the surrounding environment from the activity in the enclosure, for example, to shield the surrounding environment from noise. Another example is to shield the activity within the enclosure from the surrounding environment, for example, to shield a process or an item from air currents. The shielding could be used for example as a laboratory hood or a bread box.

Many appliances, and particularly many kitchen appliances, have powerful motors and related components that generate a substantial noise level. Food processors and blenders, for instance, can be extremely noisy whether in a residential or commercial setting. The operation of an appliance can make communication difficult. This noise can be very disruptive. For instance, a blender at a restaurant or bar may make communication between a bartender and patron very difficult. It is desirable, therefore, to have a sound enclosure to reduce or minimize the sound created by an appliance.

Appliances, and particularly blenders, can also be inadvertently knocked over. For instance, in a commercial setting of a restaurant or bar, a blender can be a problem for a bartender trying to service all the needs of multiple customers. It is desirable, therefore, to have a surrounding structure to help support a blender.

The tradeoff for obtaining sound reduction is that conventional devices may require a significant amount of clear space behind and above the appliance in order to open a sound reduction guard and obtain access to the appliance. If space is tight, then bulky sound reduction covers are not practical.

Conventional sound reduction guards that rotate may also be awkward with respect to controlling the speed of rotation of the cover guard. As a result, the cover can inadvertently be slammed open or closed. This may cause damage to a sound guard cover not to mention that it may also injure the finger of a user.

In addition, it is important that any sound reduction covers provide for easy access to an appliance. Some sound reduction products are wrapped around or so completely enclose an appliance that it is difficult to get inside and have access to or remove the appliance or a component thereof such as a blender jar.

SUMMARY OF THE INVENTION

Accordingly, it is a feature of the present invention to solve the forgoing problems and provide effective enclosures. The present shielding enclosure provides reduced noise as well as convenient and accessible housing for an appliance mounted within the enclosure. Further, the shielding enclosure has a low profile to take up minimal counter and overhead space during use.

The invention is directed to an enclosure comprising a base having a fixed wall and first and second shields defining moveable walls and being pivoted at spaced locations with respect to the base. A lost motion coupling connects the first and second shields, whereby rotation of one shield on the base drives the other shield to rotate on the base, and encloses a space defined by the walls.

In a more specific aspect, the lost motion coupling is a pin-in-slot connection.

In a still more specific aspect, the shields nest one within the other when the enclosure is open.

In one embodiment, the shielding enclosure comprises a base, a front shield and a top shield. The base is adapted to be fixedly mounted onto a surface, the base comprising a back wall and a first pair of sidewalls connected to the back wall. The sidewalls extend outwardly from the back wall, and each sidewall includes a first pin and a second pin. The first pins and second pins are parallel to each other. The front shield is adapted to be rotatably mounted onto the base and slidingly connected to the top shield. The front shield has an arcuate front panel and a second pair of sidewalls connected to the front panel. The sidewalls extend outwardly from the concave side of the front panel. The second pair of sidewalls each have a third pin and first aperture adapted to receive a corresponding first pin. The top shield is adapted to be rotatably mounted onto the base and slidingly connected to the front shield. The top shield comprises an arcuate top panel and a third pair of sidewalls connected to the top panel. Those sidewalls extend outwardly from the concave side of the top panel. The third pair of sidewalls each have a second aperture adapted to receive a corresponding second pin and first slot adapted to slidingly receive the third pin. The rotation of the front shield around an axis defined by the first pins simultaneously actuates rotation of the top shield around an axis defined by the second pins with the actuation caused by the movement of the third pin in the slot. Each of the first, second and third pairs of sidewalls is connected to the base, front plate and top plate, respectively, in a substantially perpendicular relationship. Still further, a first radius defined by the shortest distance between the first aperture and the front plate may be less than a second radius defined by the shortest distance between the second aperture and the top plate. The arcuate front panel defines a segment of a substantially circular curve defined by the first radius. The arcuate top panel may also define a segment of a substantially circular curve wherein a third radius of the curve of the top panel is larger than the second radius and wherein the rotation of the top shield around the second pins is eccentric to a circular curve defined by a third radius. Also, the slot may not be a straight line and the slot may further be adapted to decrease the rotation speed of the linked shields at the beginning and/or end of the rotation cycle.

In a further embodiment, a shielding enclosure may comprise a base, a front shield and a top shield. The base is adapted to be fixedly mounted onto a surface. The base includes a back wall and first pair of sidewalls connected to the back wall and extending outwardly from the back wall. The front shield is adapted to be rotatably mounted onto the base and slidingly connected to the top shield. The front shield has an arcuate front panel and second pair of sidewalls connected to the front panel and extending outwardly from the concave side of the front panel. The top shield is adapted to be rotatably mounted onto the base and slidingly connected to the front shield. The top shield has an arcuate top panel and third pair of sidewalls connected to the top panel and extending outwardly from the concave side of the top panel. The first pair of sidewalls is rotatably connected to the second pair of sidewalls by a first pin. The first pair of sidewalls is rotatably connected to the third pair of sidewalls by a second pin. And the second and third pairs of sidewalls are slidingly connected by a third pin in a slot wherein rotation of the front shield around an axis defined by the first pins simultaneously actuates rotation of the top shield around an axis defined by the second pins with the actuation caused by the movement of the third pin in the slot. Each of the first, second and third pairs of sidewalls may be connected to the base, front plate and top plate respectively in a substantially perpendicular relationship. Also, the arcuate front panel may be adapted to rotate in a first arc inside a second arc defined by the rotation of the top panel. Further, the slot may not be a straight line and the slot can be adapted to decrease the rotation speed of the linked shields at the beginning and/or the end of the rotation cycle.

BRIEF DESCRIPTION OF THE DRAWINGS

FIGS. 3 and 4 are side elevation views as the shielding enclosure invention shown in the fully closed and fully opened positions respectively.

DETAILED DESCRIPTION OF A PREFERRED EMBODIMENT

Figure 2:
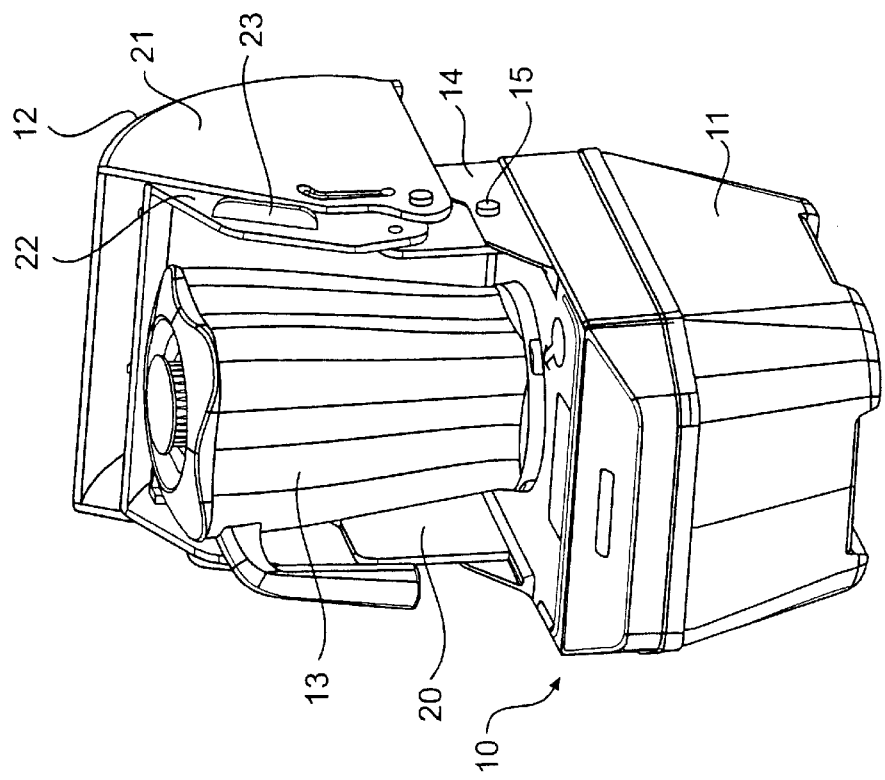
FIG. 2 is a perspective view of a blender assembly including the shielding enclosure invention shown in the opened position.
Figure 1:
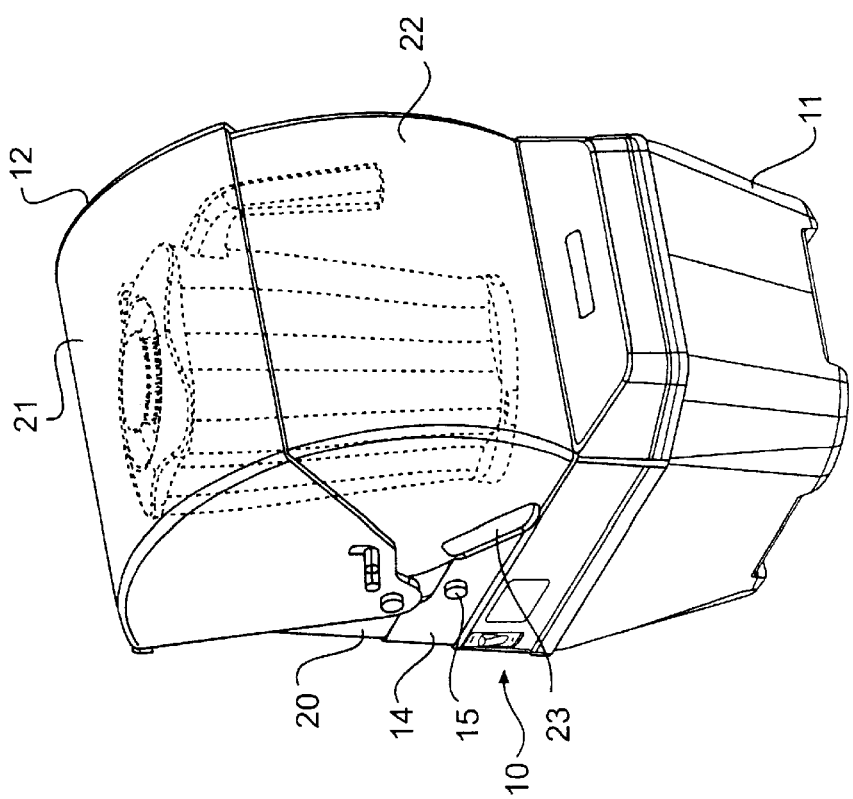
FIG. 1 is a perspective view of a blender assembly including the shielding enclosure invention shown in the closed position.

FIGS. 1 and 2 display a blender 10 made up of a base housing 11 and shielding enclosure 12. The shielding enclosure 12 is mounted onto the top of the housing 11 and encloses a blender jar 13. The top of the housing 11 includes a flange 14. The shielding enclosure 12 is made up of a base 20, a first or top shield 21 and a second or front shield 22. The base 20 is removably connected to the flange 14 by thumb screws 15. The handle 23 of the shielding enclosure 12 may be easily lifted or pulled down by a user to rotate the front shield 22 and top shield 21 to a closed position as seen in FIG. 1 or to an open position as shown in FIG. 2 where the blender jar 13 may be easily removed from or placed onto the top of the blender housing 11.

The shielding enclosure 12 is shown as part of a blender in FIGS. 1 and 2 where it is an effective sound enclosure. Of course, the shielding enclosure may be part of a food processor or similar appliance. Also, the shielding enclosure 12 may be connected to any surface, not just the top of the housing 11. For instance, the shielding enclosure 12 may be attached to a counter top and may completely enclose a blender or other appliance or any other thing that is shielded from the surrounding environment. For the purposes of discussion of the preferred embodiment of the shielding enclosure 12, it will be referred to as a sound enclosure.

Preferably, the sound enclosure 12 is made of a thick polycarbonate material that is clear so that a user of an appliance may watch the operation of the appliance when it is inside the enclosure. Of course, the sound enclosure 12 may be made of any durable material such as other types of plastic, metal, or composites. Because one of the benefits of the sound enclosure 12 is to prevent an appliance from being accidently knocked over, it is preferred that the material of the sound enclosure be rigid and substantial enough that it can not be easily bent or knocked over. Also, the sound enclosure 12 as shown completely encloses the blender jar 13. In this way, the benefits of sound reduction are maximized. Alternatively, a sound enclosure in accordance with the present invention may cover only partially the appliance adapted to be contained within it and therefore only partially reduce the sound of the appliance.

Figure 5:
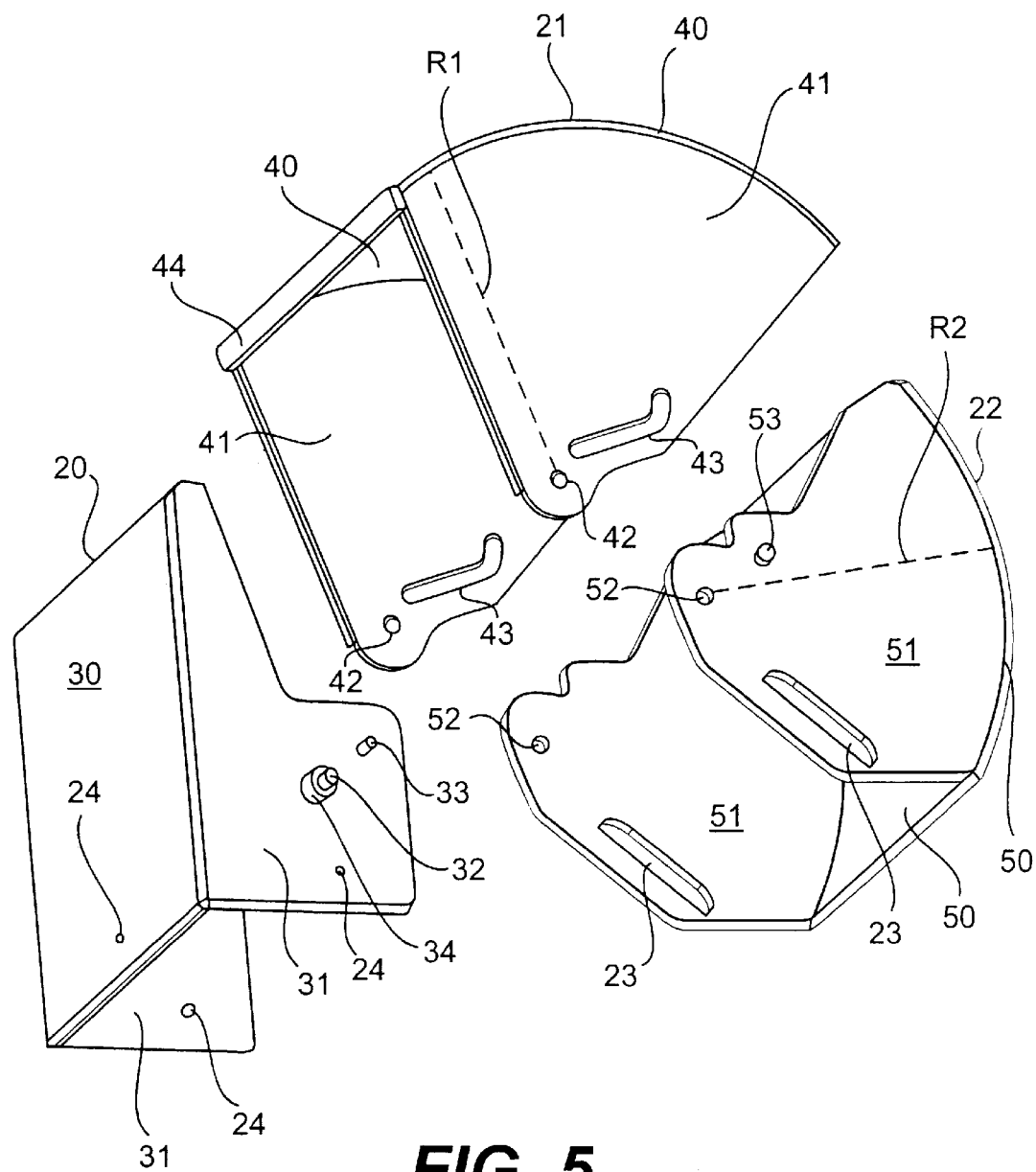
FIG. 5 is an exploded, perspective view of the base, top shield and front shield that make up the shielding enclosure of the present invention.

Turning now to FIGS. 3 through 5, the specific components of the sound enclosure 12 are shown in more detail. The base 20 includes screw holes 24 that are the screw holes that receive the thumb screws 15 that attach the sound enclosure 12 to the blender 10 as shown in FIGS. 1 and 2. The base 20 is made up of a back wall 30 and a first pair of sidewalls 31. The back wall 30 is a flat rectangular piece connected along opposite sides to the sidewalls 31. As shown, the sidewalls 31 are perpendicular to the back wall 30. The sidewalls 31 each include first and second pins 32 and 33. The first pins 32 further include a spacer 34. The pins 32 and 33 are mounted on the opposite sidewalls 31 in a straight line. The pins 32 and 33 are simple round rods that form axes around which the top shield 21 and front shield 22 will rotate, respectively.

The height of the back wall 30 is approximately the same height as the blender jar when mounted within the sound enclosure 12. Preferably, the height is slightly less, otherwise the back wall 30 becomes an additional object for the top and front shields 21 and 22 to overcome when rotating to the open or closed positions. (The top of the back wall 30 may be rounded off or otherwise curved to facilitate rotation of the shields 21 and 22.) The length of extension of the sidewalls 31 is preferably narrow in order to maximize access to the blender jar when the sound enclosure 12 is in the open position. The sidewalls 31 are merely long enough and high enough to be a base for the pins 32 and 33 that support the front and top shields 22 and 21.

The front shield 22 is made up of the movable front wall or panel 50 and a second pair of sidewalls 51. The front panel 50 is an arcuate shape. The sidewalls 51 are parallel to each other and extend outwardly from the concave side of the arcuate front panel 50. This second pair of sidewalls 51 includes the handles 23 that a user may grasp onto to rotate the enclosure open and closed. The sidewalls 51 include a pair of round apertures 52 and a pair of pins 53. The apertures 52 are adapted to be mounted onto pin 33. The round apertures 52 in combination with the round pins 33 allow for the rotational movement or pivoting of the front shield 22. The arcuate curve of the front panel 50 is a portion of a circular curve defined by R2, the distance from the aperture 52 to the front plate 50. The radius R2 plus the height of the pin 33 from the bottom of the sidewall 31 should be slightly higher than the height of the blender jar or other appliance being covered. If the combination of radius plus height is less, then the front shield can not rotate cleanly over the blender jar or other appliance. If the combination of radius plus height is substantially larger, then there is wasted space in the rotation and covering of the appliance in both the open and closed positions.

The top shield 21 is made up of the movable, arcuate top wall or panel 40 and the third pair of sidewalls 41. The sidewalls 41 are parallel to each other and extend outwardly from the concave side of the arcuate top panel 40. The sidewalls 41 include a pair of apertures 42 and a pair slots 43. There is also a back lip 44 attached along the back of the top panel 40 to seal out any noise that might leak out from any gap between the top of the back wall 30 and the top panel 40. Radius R1 is the shortest distance from aperture 42 to the top wall 40. R1 is slightly longer than R2 to allow the front shield 22 to rotate and telescope inside the top shield 21. The apertures 42 are adapted to be mounted on the pair of pins 32. The spacer 34 insures that the rotation or pivoting of the front shield 22 will be inside the rotation of the top shield 21. The arcuate curve of the top panel 40 is a portion of a circular curve defined by a radius greater than R1. As a result, the rotation of the top shield 21 is eccentric to the hypothetical rotation of the top shield 21 around the radius of the circle defined by the arcuate top panel 40. This eccentric rotation allows room for fins or other protuberances (not shown) on the bottom of the top panel 40 that may be included to engage and hold the top of, for instance, a blender jar. The eccentric rotation further facilitates the telescoping of the front shield 22 underneath the top shield 21.

The pins 53 in the sidewalls 51 of the front shield 22 are adapted to be received within the slots 43 in the sidewalls 41 of the top shield 21 to form a pin-in-slot connector 58. In this way, the top and front shields 21 and 22 are linked so that rotation of the front shield will acuate the rotation of the top shield. Alternatively, the top and front shields 21 and 22 are not necessarily linked and a top shield or front shield may further include a flange that would engage the other upon rotation of the front shield. The pin in slot design shown is preferable, because there is even pressure in the opening and closing of the enclosure. The front and top shields cannot be a single piece, because the apparatus could not rotate fully backwards and this would result in a blocked access to the blender jar or other appliance. It is important that the sound enclosure be multiple pieces so that the pieces can telescope and rotate behind the hypothetical vertical cylinder over the blender jar or other appliance for easy insertion and removal. An enclosure could have more than two moving pieces, especially if it desirable or necessary to have a lower, back base wall. A longer arc would then be necessary to cover the jar inside the enclosure. There would also be more linkages required to resolve a multiple piece enclosure. Also, the different radii shown in the drawings are not absolutely necessary. The rotation of the various enclosure components may have the same radii, but the pin about which they rotate would necessarily be staggered so that the different components could rotate in a telescoping fashion.

As shown, each pair of sidewalls 31, 41 and 51 in connection with the back, top and front shields 20, 21 and 22 is parallel to each other and perpendicular to the panel components 30, 40 and 50. It is not necessary that each pair of sidewalls be perpendicular to the corresponding panels. It is only necessary that each of the pairs of pins about which the moving shields rotate form a straight line to thereby define an axis and enable the rotation. Curves and other shapes are possible.

The linkage of the front and top shields 22 and 21 allows for easy and smooth opening and closing of the enclosure 12. An alternative to the linkage shown in the attached drawings includes a classic telescoping apparatus where a front and top shield rotate on the same axis with the front shield rotating inside or outside of the top shield. A front shield could rotate alone until some edge or lip on either the top or front shield becomes engaged to then rotate both components open or closed.

By having different rotational axes as shown, the linkage is more complicated. As can be see, the front shield 22 rotates much further around its rotational circle than the top shield 21 does around its rotational circle. This is because the pin-in-slot connection 58 provides a lost-motion coupling. The relative geometry of the linkage as shown allows for concurrent rotation at different speeds so that both the front and top shields 22 and 21 are moving at the same time, just over different rotational distances.

Figure 6A:
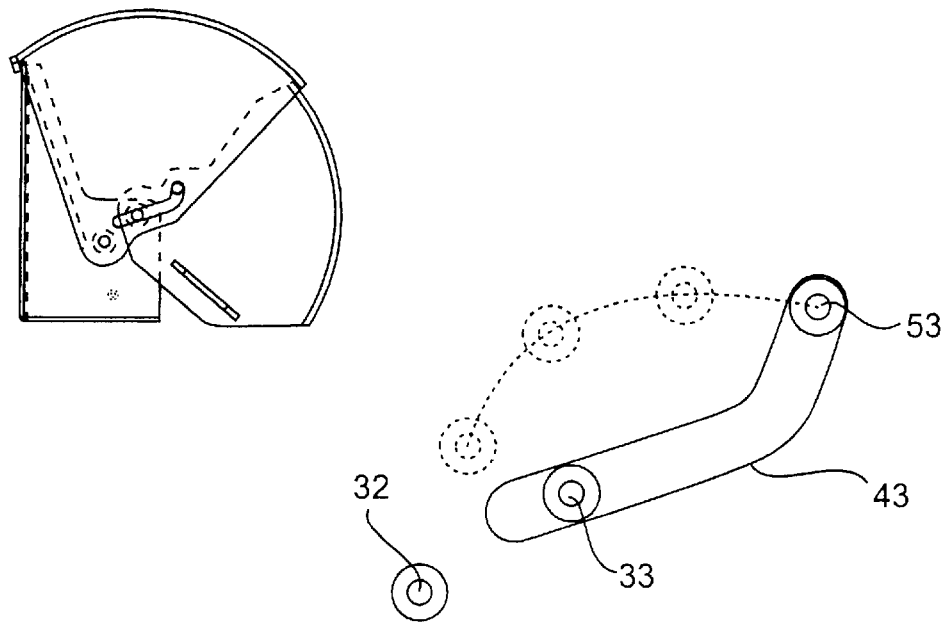
FIGS. 6(A–D) is a series of side elevation views demonstrating the operation of the linkage connecting the top and front shields.
Figure 6B:
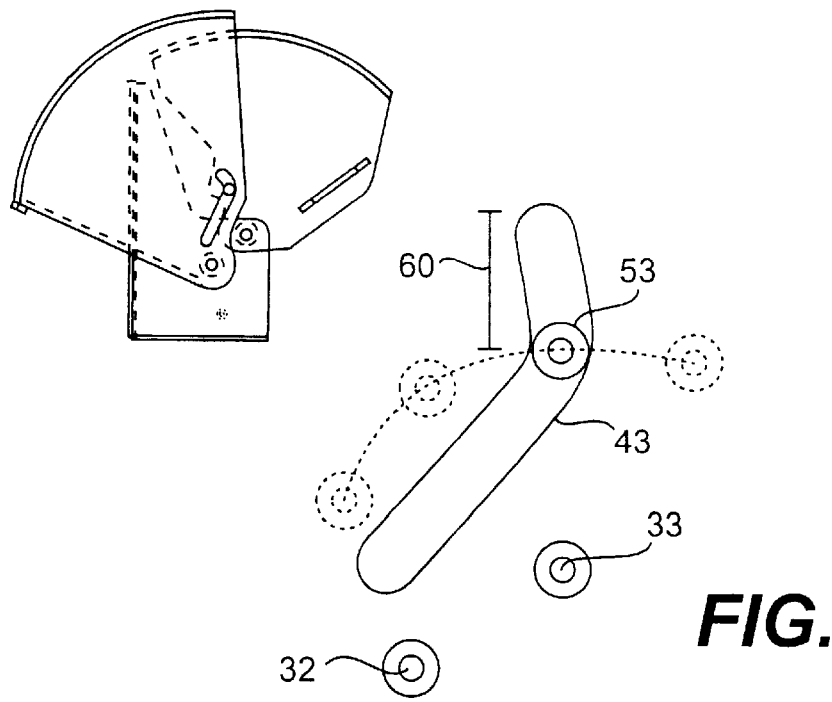

Still further, the linked rotation of the preferred embodiment shown in the drawings is designed to be slower in the beginning and ending stages of the linked rotation cycle—regardless of whether the enclosure is being opened or closed. As shown in the series of drawings in FIGS. 6(A–D), the progression of an opening rotational cycle is shown in FIGS. 6A to 6B. In the first segment of rotation (from the position shown in FIG. 6A to the position shown in FIG. 6B), pin 53 moves along length 60 of the slot 43. The slots 43 have first and second legs that extend transverse with respect to each other in a "hockey-stick" shape as shown. This movement along the end of the hockey-stick shaped slot 43 slows the combined movement of the linked shields 21 and 22 by slowing the rotational speed of the top shield 21. The second segment of rotation from FIGS. 6B to 6C, the pin 53 moves along length 61 of slot 43. This length 61 is from the end of the blade of the hockey-stick shaped of the slot 43 until the pin 53 is vertically aligned with pin 32—the axis of rotation for the top shield 21. This second segment of rotation provides for relatively rapid rotation of the top shield with respect to the front shield. The third segment of rotation from FIG. 6C to FIG. 6D is the movement of pin 53 along length 62. During this segment of rotation, the movement of the linked shields is slowed by reducing the relative rotational movement of the top shield with respect to the bottom shield.

Of course, other linkage geometries may be used whether two moving components such as shields 21 and 22 are used or whether there are more moving components. It may be desirable to speed up or slow down relative rotational speeds at different stages of an enclosure. Those of skill in the art will understand the variations available.

While the invention has been described with reference to specific embodiments thereof, i.e. sound enclosures, it will be understood that numerous variations, modifications and additional embodiments are possible, for example, enclosures for other purposes and accordingly, all such variations, modifications, and embodiments are to be regarded as being within the spirit and scope of the invention.

What is claimed is:

1. A sound enclosure comprising a base, a front shield and a top shield, the base adapted to be fixedly mounted onto a surface, the base comprising a back wall and first pair of sidewalls connected to the back wall and extending outwardly from the back wall, wherein the sidewalls each comprise a first pin and a second pin, the first pins and second pins being parallel to each other, the front shield adapted to be rotatably mounted onto the base and slidingly connected to the top shield, the front shield comprising an arcuate front panel and a second pair of sidewalls connected to the front panel and extending outwardly from the concave side of the front panel, wherein the sidewalls each comprise a third pin and a first aperture adapted to receive a corresponding first pin, the top shield adapted to be rotatably mounted onto the base and slidingly connected to the front shield, the top shield comprising an arcuate top panel and a third pair of sidewalls connected to the top panel and extending outwardly from the concave side of the top panel, wherein the sidewalls each comprise a second aperture adapted to receive a corresponding second pin and a first slot adapted to slidingly receive the third pin, and wherein rotation of the front shield around an axis defined by the first pins simultaneously actuates rotation of the top shield around an axis defined by the second pins, the actuation caused by the movement of the third pin in the slot.

2. A sound enclosure as described in claim 1, wherein each of the first, second and third pairs of sidewalls is connected to the base, front plate and top plate respectively in a substantially perpendicular relationship.

3. A sound enclosure as described in claim 1, wherein a first radius defined by the shortest distance between the first aperture and the front plate is less than a second radius defined by the shortest distance between the second aperture and the top plate.

4. A sound enclosure as described in claim 3, wherein the arcuate front panel defines a segment of a substantially circular curve defined by the first radius.

5. A sound enclosure as described in claim 4, wherein the arcuate top panel defines a segment of a substantially circular curve, wherein a third radius of the curve of the top panel is larger than the second radius, and wherein the rotation of the top shield around the second pin is eccentric to a circular curve defined by the third radius.

6. A sound enclosure as described in claim 1, wherein the slot is not a straight line, and further wherein the slot is adapted to decrease the rotation speed of the linked top shield and front shield at the beginning of the rotation cycle.

7. A sound enclosure as described in claim 1, wherein the slot is not a straight line, and further wherein the slot is adapted to decrease the rotation speed of the linked top shield and front shield at the end of the rotation cycle.

8. A sound enclosure comprising a base, a front shield and a top shield, the base adapted to be fixedly mounted onto a surface, the base comprising a back wall and first pair of sidewalls connected to the back wall and extending outwardly from the back wall, the front shield adapted to be rotatably mounted onto the base and slidingly connected to the top shield, the front shield comprising an arcuate front panel and a second pair of sidewalls connected to the front panel and extending outwardly from the concave side of the front panel, the top shield adapted to be rotatably mounted onto the base and slidingly connected to the front shield, the top shield comprising an arcuate top panel and a third pair of sidewalls connected to the top panel and extending outwardly from the concave side of the top panel, wherein the first pair of sidewalls is rotatably connected to the second pair of sidewalls by a first pin, the first pair of sidewalls is rotatably connected to the third pair of sidewalls by a second pin, and the second and third pairs of sidewalls are slidingly connected by a third pin in a slot, and wherein rotation of the front shield around an axis defined by the first pins simultaneously actuates rotation of the top shield around an axis defined by the second pins, the actuation caused by the movement of the third pin in the slot.

9. A sound enclosure as described in claim 8, wherein each of the first, second and third pairs of sidewalls is connected to the base, front plate and top plate respectively in a substantially perpendicular relationship.

10. A sound enclosure as described in claim 8, wherein the arcuate front panel is adapted to rotate in a first arc inside a second arc defined by the rotation of the top panel.

11. A sound enclosure as described in claim 8, wherein the slot is not a straight line, and further wherein the slot is adapted to decrease the rotation speed of the linked top shield and front shield at the beginning of the rotation cycle.

12. A sound enclosure as described in claim 8, wherein the slot is not a straight line, and further wherein the slot is adapted to decrease the rotation speed of the linked top shield and front shield at the end of the rotation cycle.

13. An enclosure, comprising
a base comprising a wall;
first and second shields each defining a moveable wall and pivoted at spaced locations to the base; and
a lost motion coupling between the first and second shields,
whereby rotation of one shield on the base drives the other shield to rotate on the base to enclose a space defined by the walls.

14. The enclosure of claim 13, wherein the lost motion coupling is a pin-in-slot connection.

15. The enclosure of claim 14, wherein the pin-in-slot connection comprises a slot in one of the shields which has first and second legs extending transverse with respect to one another and a pin on the other of the shields.

16. The enclosure of claim 15, wherein the wall of the first shield defines a top wall of the enclosure and wherein the wall of the second shield defines a front wall of the enclosure, the wall of the base defining a back wall.

17. The enclosure of claim 16, wherein the walls of the first and second shields are arcuate and wherein the shields telescope one within the other when the enclosure is open.

18. The enclosure of claim 17, wherein the front shield has the pin of the pin-in-slot connection wherein rotation of the front shield drives the second shield to rotate when both closing and opening the enclosure.

19. The enclosure of claim 18, wherein the first shield is telescoped within the second shield when the enclosure is open and wherein there is a handle on the first shield which is accessable when the enclosure is open and the shields are telescoped.

20. The enclosure of claim 13, wherein the base includes a pair of sidewalls to which the first and second shields are pivoted and wherein the base is mounted detachably on a support.

* * * * *